(12) United States Patent
Raikin et al.

(10) Patent No.: US 8,688,962 B2
(45) Date of Patent: Apr. 1, 2014

(54) GATHER CACHE ARCHITECTURE (75) Inventors: Shlomo Raikin, Geva Carmel (IL); Robert Valentine, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 353 days.

(21) Appl. No.: 13/078,380

(22) Filed: Apr. 1, 2011

(65) Prior Publication Data
US 2012/0254542 A1 Oct. 4, 2012

(51) Int. Cl.
*G06F 9/30* (2006.01)

(52) U.S. Cl.
USPC ......... 712/225; 712/4; 711/3; 711/5; 711/108

(58) Field of Classification Search
USPC ................. 712/225, 4; 711/3, 5, 108
See application file for complete search history.

(56) References Cited

U.S. PATENT DOCUMENTS

| | | | | |
|---|---|---|---|---|
| 5,506,978 A | * | 4/1996 | Komori | 711/109 |
| 5,623,628 A | * | 4/1997 | Brayton et al. | 711/141 |
| 5,655,102 A | * | 8/1997 | Galles | 711/150 |
| 5,751,986 A | * | 5/1998 | Fetterman et al. | 712/218 |
| 6,112,297 A | * | 8/2000 | Ray et al. | 712/225 |
| 7,627,735 B2 | * | 12/2009 | Espasa et al. | 712/7 |
| 2003/0088760 A1 | * | 5/2003 | Chowdhury et al. | 712/225 |
| 2009/0172364 A1 | * | 7/2009 | Sprangle et al. | 712/225 |
| 2012/0060015 A1 | * | 3/2012 | Eichenberger et al. | 712/4 |

* cited by examiner

*Primary Examiner* — Andrew Caldwell
*Assistant Examiner* — Yuqing Xiao
(74) *Attorney, Agent, or Firm* — Trop, Pruner & Hu, P.C.

(57) ABSTRACT

Apparatuses and methods to perform gather instructions are presented. In one embodiment, an apparatus comprises a gather logic module which includes a gather logic unit to identify locality of data elements in response to a gather instruction. The apparatus includes memory comprising a plurality of memory rows including a memory row associated with the gather instruction. The apparatus further includes memory structure to store data element addresses accessed in response to the gather instruction.

18 Claims, 5 Drawing Sheets

GATHER CACHE ARCHITECTURE

FIELD OF THE INVENTION

Embodiments of the invention relate to in computer systems; more particularly, embodiments of the invention relate to gathering data in computer memory.

BACKGROUND OF THE INVENTION

Newer software code is being generated to run on microprocessors as the computing technology advances. The types of instructions and operations supported by a microprocessor are also expanding. Certain types of instructions require more time to complete depending on the complexity of the instructions. For example, instructions that manipulate two-dimensional arrays via a series of micro-code operations result in longer execution than other types of instructions.

In addition, a common problem in processing data structures (e.g., one-dimensional arrays, linked lists, and two-dimensional arrays) is that the data are not stored in a format that is suitable for vector processing. For example, data that are organized in a two-dimensional array by rows are to be consumed by column (i.e., a transpose operation). Vector instructions gather data from different locations in memory by using regular load operations and shift/insert operations. It can be a limiting factor of vectorization. Future software code will require even higher performance including the capability to execute instructions that manipulate two-dimensional arrays efficiently.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Apparatuses and methods to perform gather instructions are presented. In one embodiment, an apparatus comprises a gather logic module which includes a gather logic unit to identify locality of data elements in response to a gather instruction. The apparatus includes memory comprising a plurality of memory rows including a memory row associated with the gather instruction. The apparatus further includes memory structure to store data element addresses accessed in response to the gather instruction.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for performing gather instructions. Specifically, performing gather instructions is primarily discussed in reference to multi-core processor computer systems. However, the method and apparatus for performing gather instructions are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads.

Overview

Figure 1:
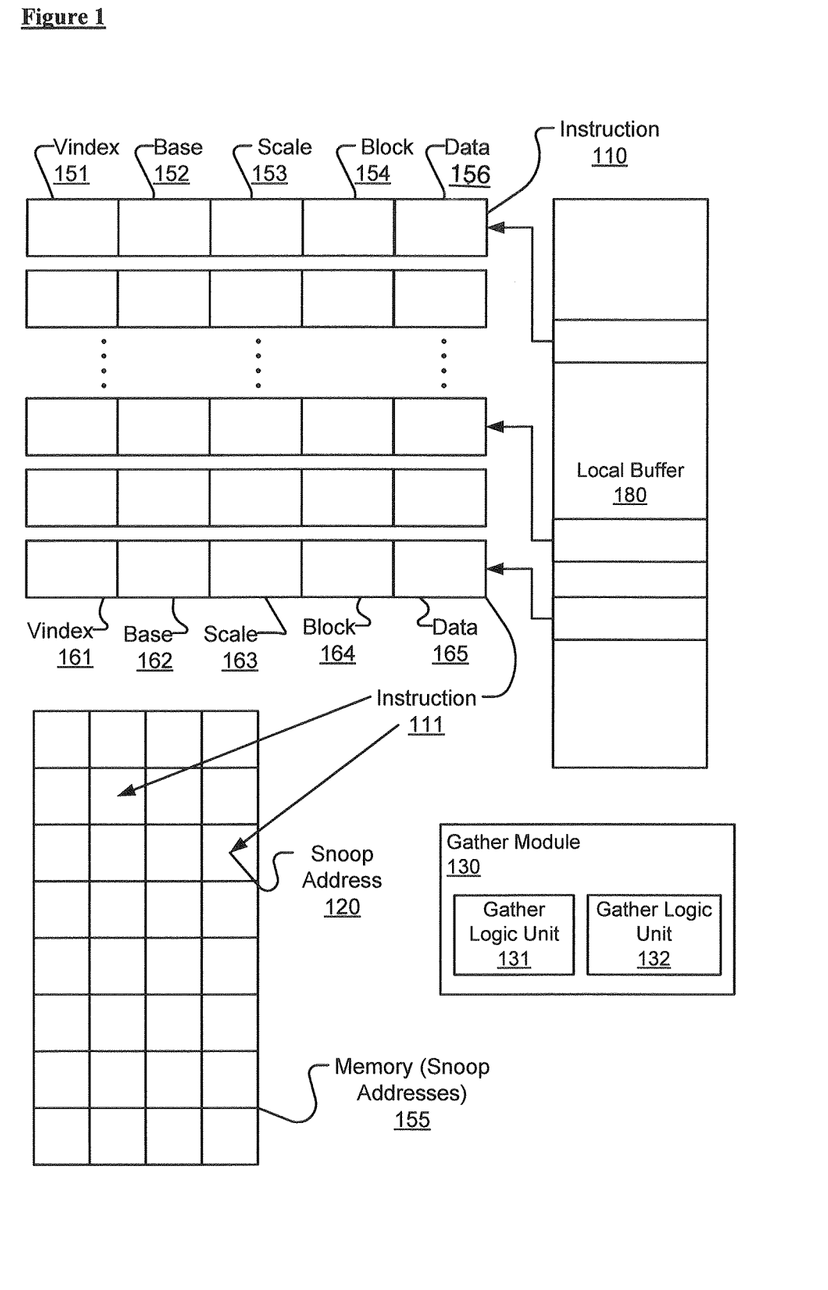
FIG. 1 is a block diagram of an apparatus for performing gather instructions.

FIG. 1 is a block diagram of an apparatus for performing gather instructions. Many related components such as buses and peripherals have not been shown to avoid obscuring the invention. Referring to FIG. 1, in one embodiment, the gather instruction apparatus comprises gather module 130, local buffer 180, memory 155 for snoop addresses, and result registers (e.g., data 165 in FIG. 1). In one embodiment, gather module 130 further includes gather logic unit 131 and gather logic unit 132. The apparatus provides a fast way to gather data from a main memory into a vector register where data locality exists. A gather instruction, in one embodiment, is in the form of: "GATHER result register {mask}, [Base+Vector_Index*scale+displacement]"

In one embodiment, the aforementioned units are shown as discrete components. Other embodiments are possible where some or all of these units are integrated within a device or within other components. In other embodiments, the aforementioned units are distributed throughout a system in hardware, software, or some combination thereof.

In one embodiment, local buffer 180 includes memory rows. In one embodiment, a memory row is used to store architectural information about a gather instruction. In one embodiment, a memory row includes an address related structure and a data portion. The data portion (e.g., data 156 and data 165) is used to accumulate the data read in response to a gather instruction (load operations). An address structure includes information such as, for example, vector index (e.g., vindex 151, vindex 161), base (e.g., base 152, base 162), and scale (e.g., scale 153, scale 163).

In one embodiment, memory 155 stores a large array of addresses used for memory ordering.

In one embodiment, an apparatus of gather instructions is used in an "out of order" (OOO) processor. It will be appreciated by those skilled in the art that an in order processor may be used in conjunction with the apparatus of gather instructions.

In one embodiment, gather module 130 and memory devices (e.g., local buffer 180, memory 155) are a part of a memory execution unit (MEU) such that a few gather instructions are managed concurrently. In one embodiment, gather module 130 and the memory devices are coupled to a MEU. In one embodiment, the aforementioned units are shown as discrete components. Other embodiments are possible where some or all of these units are integrated within a device or within other components. In other embodiments, the aforementioned units are distributed throughout a system in hardware, software, or some combination thereof.

In one embodiment, an OOO execution unit dispatches a single load micro-operation (uop) to the MEU. The MEU writes back only once to the OOO execution unit.

In one embodiment, a gather instruction requires one or more loads (load operations) based on the width of the gather instruction and the width of each data element. For example, if the width of a gather instruction is 64 byte and the width of each data element is 4 byte, the gather instruction includes 16 data elements to be loaded.

In one embodiment, a gather instruction is allocated one load buffer entry (e.g., a memory row of local buffer 180). The load buffer entry (a memory row) serves as the interface between the MEU and the OOO execution unit, as if the entire gather instruction comprises a single load operation. Gather module 130 (within the MEU) performs all loads to gather the data elements into a local buffer entry and only write the data back once.

In one embodiment, for example, gather instruction 111 is allocated with a memory row comprising vindex 161, base 162, scale 163, block 164, and data 165. The memory row holds (stores) relevant architectural data for address computation. The memory row (e.g., data 165) accumulates different parts of the data. Block 164 is used to manage the execution of the loads originated from a gather instruction. For example, if a load operation from a gather instruction requires one or more hardware resources (e.g., page miss handler) and the resource(s) is busy, the load operation is blocked until the resources is released.

In one embodiment, some locality exists within different data elements that are to be gathered in response to a gather instruction. This locality is opportunity to save unnecessary memory accesses and to read a number of data elements using a single load dispatch.

In one embodiment, gather logic unit 131 is part of gather module 130 that is operable to identify locality among data elements of a gather instruction (the locality of a gather instruction). In one embodiment, for example, the locality is based on cache line locality, where different loads in a gather instruction reside in a single cache line. In one embodiment, gather logic unit 131 and gather logic 132 are to serve two different memory ports independently.

Operations

Figure 2A:
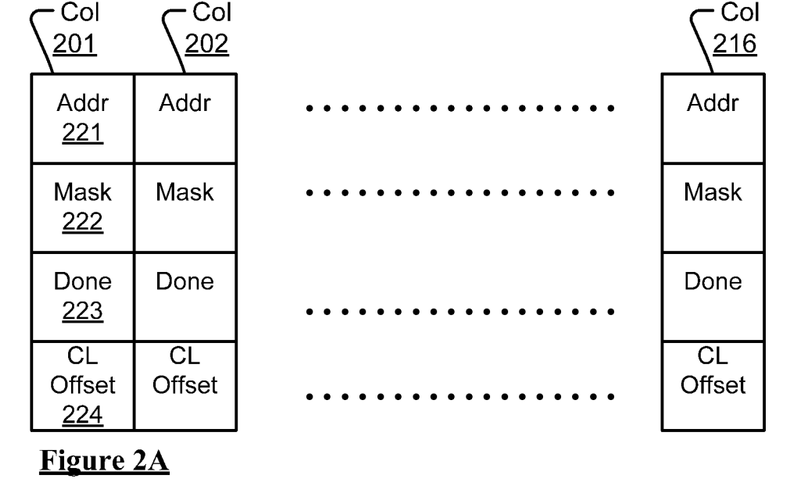
FIGS. 2A and 2B are block diagrams illustrating data locality detection in accordance with one embodiment of the invention.
Figure 2B:
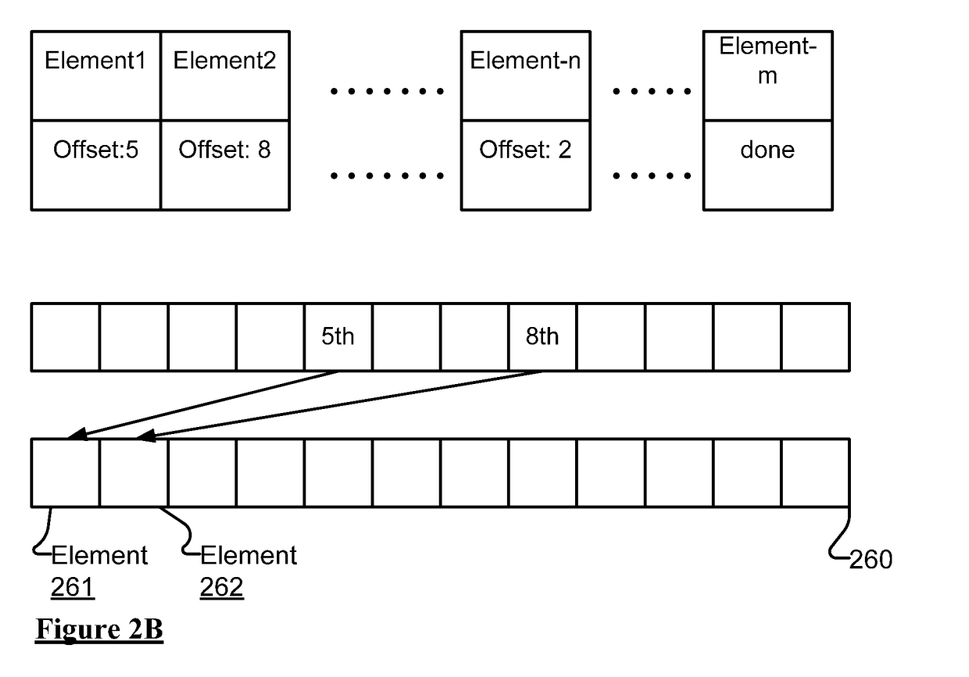

FIGS. 2A and 2B are block diagrams illustrating data locality detection in accordance with one embodiment of the invention.

In one embodiment, the process for identifying locality is shown in FIG. 2A. In one embodiment, gather logic unit 131 performs an iterative process: going from left to right. The process begins from the left most data element which is not masked out (e.g., mask 222) and is not "done" (e.g., done 223). Gather logic unit 131 then searches (accesses/scans) all addresses to the right. Gather logic unit 131 identifies addresses that reside in a same cache line. In one embodiment, for example, if the first non-masked and not-"done" data element is the $5^{th}$ data element, gather logic unit 131 continues to scan 6th data element to $15^{th}$ data element. In one embodiment, the memory structure is a content addressable memory (CAM). Gather logic unit 131 is capable of performing access to the memory structure in the manner of accessing a CAM.

In one embodiment, cache line offset 224 is the offset in the cache line where a data element resides.

In one embodiment, gather logic unit 131 identifies which elements reside in a same cache line. Gather logic unit 131 identifies what is the offset within the cache line of each data element. Gather logic unit 131 then generates the control information to a data cache rotator. In one embodiment, a data cache rotator is capable of performing a permutation operation, a rotation, a shuffle operation, a shift operation, or other data ordering operations.

Referring to FIG. 2B shows how the control for data rotation is calculated. In one embodiment, for example, the data element (element 261) in the first location of result register 260 (e.g., data 165 with respect to FIG. 1) resides in the 5th chunk in a cache line. The second data element (element 262) resides in the 8th chunk in the cache line. Gather logic unit 131 sends one load operation after the other until all non-masked elements are "done" (loaded). In one embodiment, gather logic unit 131 accumulates the results in the "data" portion (e.g., data 165 with respect to FIG. 1). If all loads are completed, gather logic unit 131 schedules a write-back cycle to the OOO execution unit.

In one embodiment, the memory ordering is maintained by using a large snoop structure (e.g., memory 155 with respect to FIG. 1) and pointers pointing from a load buffer (load buffer 180) to gather instruction data entry (a memory row).

In one embodiment, when gather logic unit 131 generates a load to a specific address, gather logic unit 131 stores the address in the snoop structure. A pointer is set in the snoop structure to denote which gather instruction accessed the given address. It is possible that more than one gather instruction is associated with a single address in the snoop structure.

In one embodiment, if a snoop hits a valid entry in the snoop structure, a "snoop hit" indication is sent to the relevant gather instruction and the indication will be set at the memory row (local buffer entry) allocated for the gather instruction.

In one embodiment, prior to retiring a gather instruction, the load buffer that holds the gather instruction ensures that the "snoop hit" indication is not set. If the "snoop hit" indication is set, the gather instruction will be aborted.

In one embodiment, gather logic unit 131 operates in conjunction with other microcode routines in some difficult cases. The MEU identifies such difficult cases (e.g., a gather access to un-cached memory type, a fault on a gather load operation) and then triggers a microcode routine to assist.

It will be appreciated by those skilled in the art that memory 155, local buffer 180, the number of gather logic units may be scaled up or down while maintaining approximately the same characteristic. In addition to that, a data element may be scalar floating point data, integer data, packed integer data, packed floating point data, or a combination thereof. The number of bytes of a data element may be scaled up or down (e.g., byte, word, and double words) in different embodiments.

In one embodiment, memory 155/local buffer 180 includes, but not limited to, memory registers, scalar integer registers, scalar floating point registers, packed single precision floating point registers, packed integer registers, a data cache, a register file, a part of a data cache, a part of a register file, or any combination thereof. In one embodiment, memory array 155/local buffer 180 stores two-dimensional arrays in the memory registers, scalar integer registers, scalar floating point registers, packed single precision floating point registers, packed integer registers, a data cache, a register file, a part of a data cache, a part of a register file, or any combination thereof.

Figure 3:
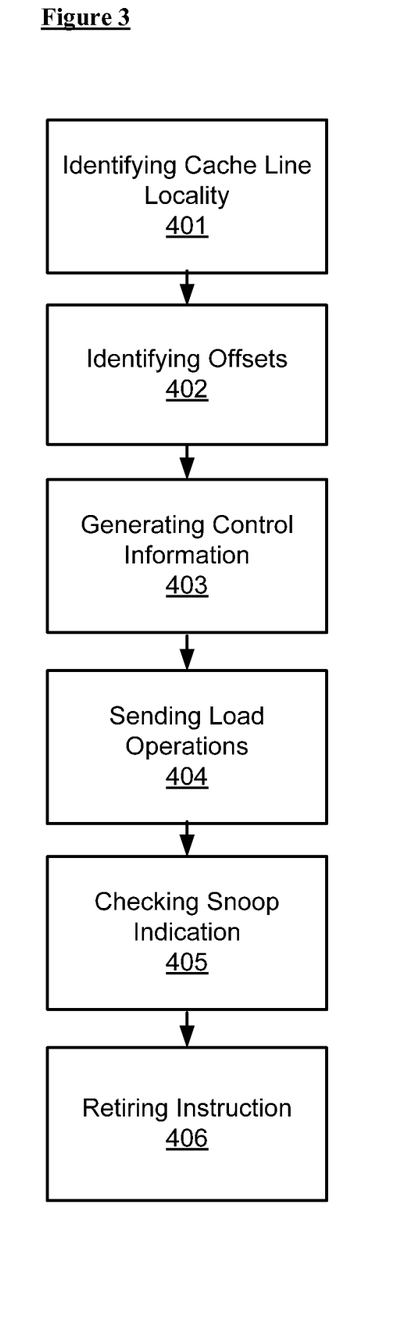
FIG. 3 is a flow diagram of one embodiment of a process to perform gather instruction.

FIG. 3 is a flow diagram of one embodiment of a process to perform gather instruction. The process is performed by processing logic that may comprise hardware (circuitry, dedicated logic, etc.), software (such as is run on a general purpose computer system or a dedicated machine), or a combination of both. In one embodiment, the process is performed in conjunction with gather logic unit (e.g., gather logic unit 131 with respect to FIG. 1). In one embodiment, the process is performed by a computer system with respect to FIG. 4.

In one embodiment, processing logic identifying locality of data elements in response to a gather instruction (process block 401). Information about the gather instruction is stored in a memory row of a local buffer. Processing logic identifies data elements that reside in a same cache line.

In one embodiment, processing logic identifies offsets of data elements (process block 402). In one embodiment, processing logic generates control information based on the offsets (process block 403).

In one embodiment, processing logic sends load operations to gather the data elements (process block 404). In one embodiment, processing logic also stores one or more data element addresses accessed in response to the gather instruction. The data element addresses are stored in a snoop memory structure.

In one embodiment, processing logic check a snoop indication (process block 405). When a snoop hits a valid entry in the snoop memory structure, processing logic sets a snoop indication ("snoop hit") of the gather instruction.

In one embodiment, processing logic retires a gather instruction if the "snoop hit" indication is not set (process block 406). Processing logic schedules one write-back cycle to an execution unit. Otherwise, processing logic aborts the gather instruction if the "snoop hit" indication is set.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 4:
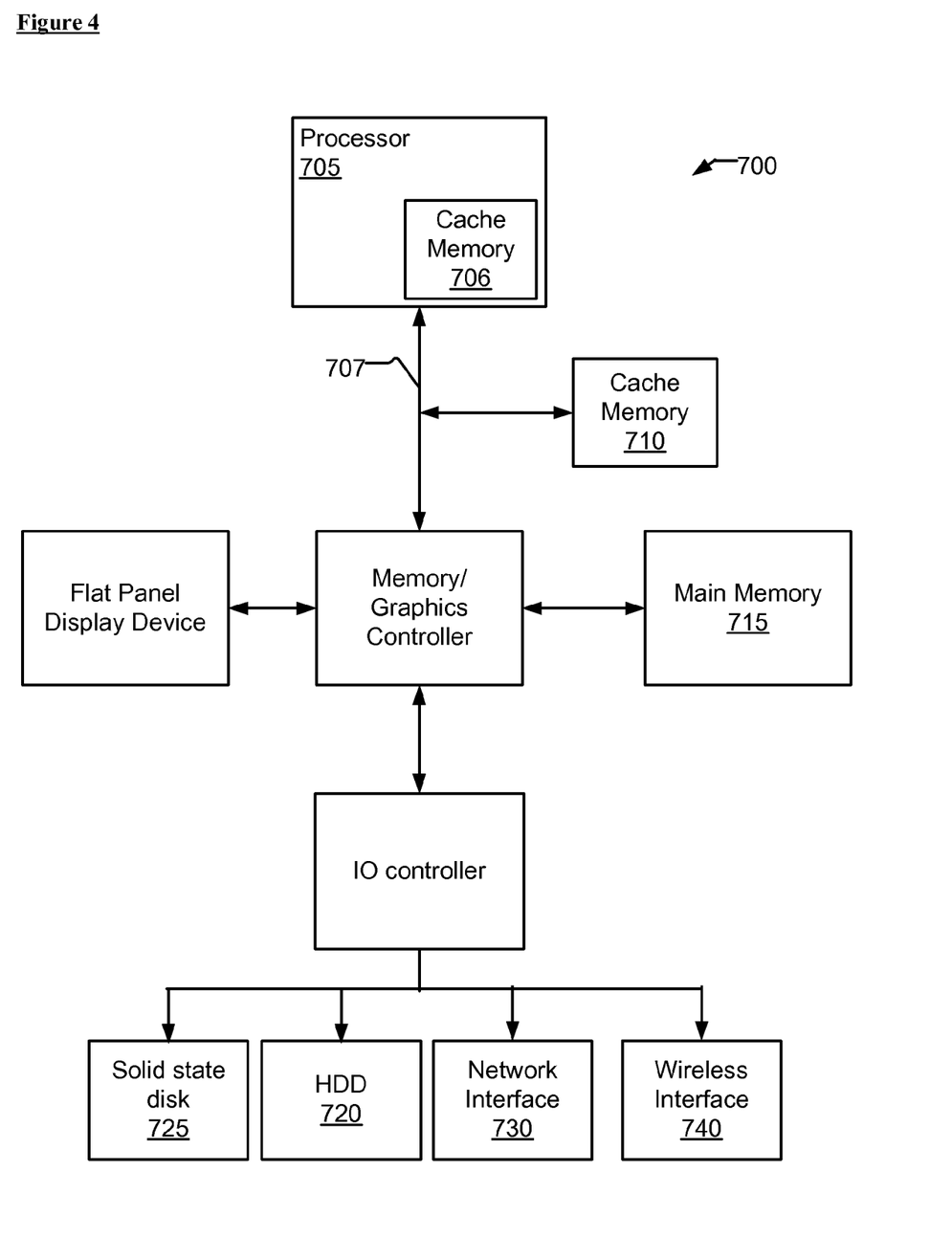
FIG. 4 illustrates a computer system for use with one embodiment of the present invention.

FIG. 4, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 4. Furthermore, in other embodiments of the invention may be distributed throughout several circuits, logic units, or devices illustrated in FIG. 4.

Figure 5:
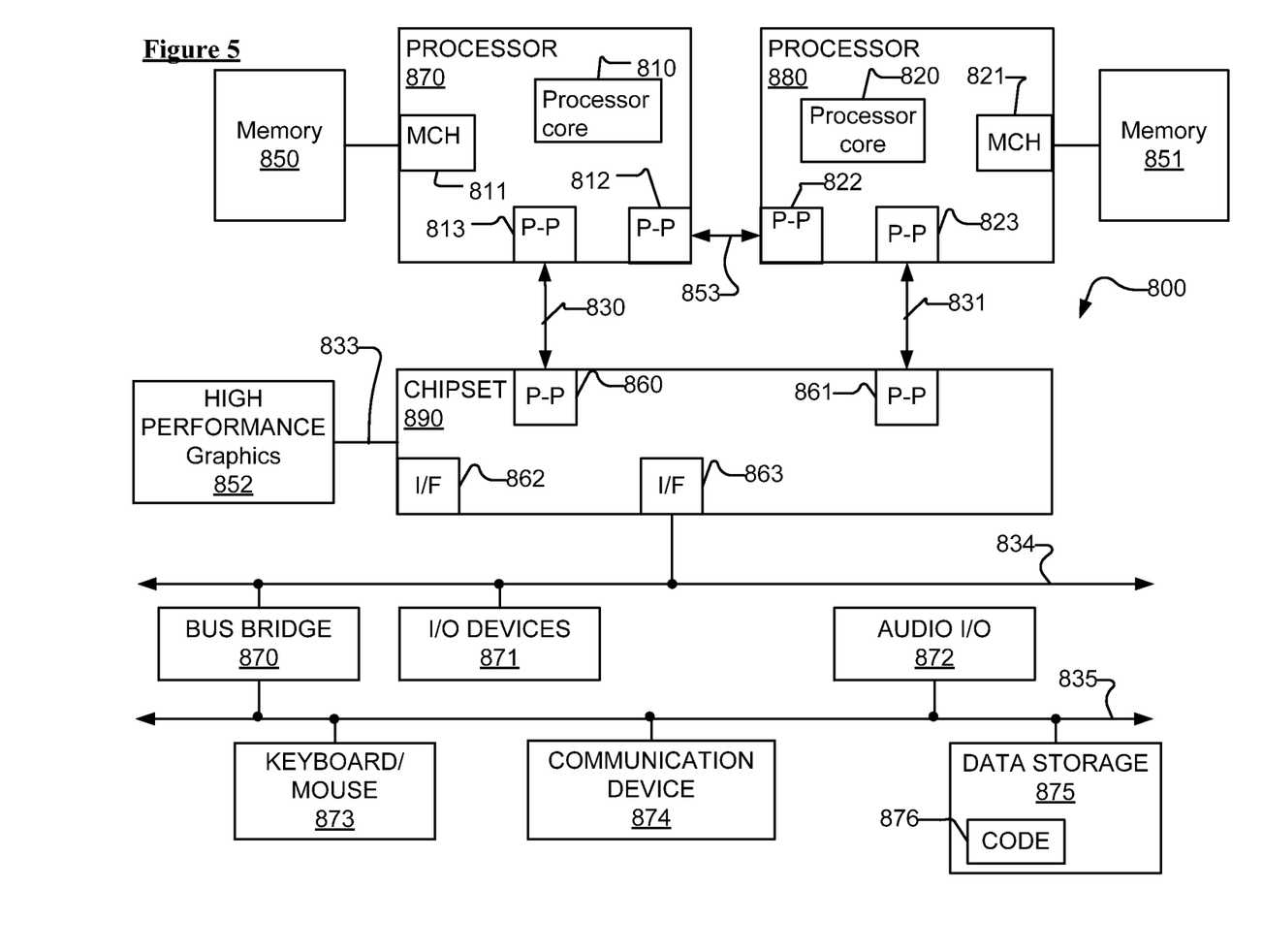
FIG. 5 illustrates a point-to-point computer system for use with one embodiment of the invention.

Similarly, at least one embodiment may be implemented within a point-to-point computer system. FIG. 5, for example, illustrates a computer system that is arranged in a point-to-point (PtP) configuration. In particular, FIG. 5 shows a system where processors, memory, and input/output devices are interconnected by a number of point-to-point interfaces.

The system of FIG. 5 may also include several processors, of which only two, processors 870, 880 are shown for clarity.

Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 5.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A processor comprising:
 a gather logic module comprising a first gather logic unit to identify locality of data elements in response to a first gather instruction;
 a first memory comprising a plurality of memory rows including a first memory row associated with the first gather instruction, the first memory row including a first portion to store data obtained in response to the first gather instruction and a second portion to store a snoop indication; and
 a second memory to store one or more data element addresses accessed in response to the first gather instruction, the second memory to store a pointer to denote that the first gather instruction accessed the one or more data element addresses, wherein if a snoop hits a valid entry in the second memory corresponding to the one or more data element addresses, the snoop indication is stored in the first memory row.

2. The processor of claim 1, wherein the processor further comprises a memory execution unit, coupled to the first memory, to manage gather instructions including the first gather instruction and to write back only once a result of the first gather instruction.

3. The processor of claim 1, wherein the first gather logic unit is operable to determine data locality based at least on cache line locality.

4. The processor of claim 1, wherein the first gather logic unit is operable to access the first memory row in a manner of a content-addressable memory to identify data elements that reside in a same cache line.

5. The processor of claim 1, wherein the first gather logic unit is operable to iteratively identify data elements that reside in a same cache line;
 identify offsets of the data elements;
 generate control information to a data cache rotator based on the offsets; and
 send one or more load operations until all non-masked data elements are gathered.

6. The processor of claim 1, wherein the first gather logic unit is operable to schedule one write-back cycle to an execution unit of the processor in response to the first gather instruction.

7. The processor of claim 1, wherein the first memory row is to store architectural information associated with the first gather instruction including status of hardware resources.

8. The processor of claim 1, wherein the first memory row is to store information associated with the first gather instruction including blocked hardware resources required by the first gather instruction.

9. The processor of claim 1, wherein the first gather logic unit is operable to set or to clear the snoop indication associated with the first gather instruction and to determine whether to retire the first gather instruction based on the snoop indication.

10. A method comprising:
 identifying locality of data elements in response to a first gather instruction, wherein information about the first gather instruction is stored in a first memory row of a first memory, the first memory row including a first portion to store data obtained in response to the first gather instruction and a second portion to store a snoop indication; and
 storing in a second memory one or more data element addresses accessed in response to the first gather instruction, the second memory to store a pointer to denote that the first gather instruction accessed the one or more data element addresses, wherein if a snoop hits a valid entry in the second memory corresponding to the one or more data element addresses, the snoop indication is stored in the first memory row.

11. The method of claim 10, further comprising accessing the first memory row in a manner of a content-addressable memory for identifying data elements that reside in a same cache line.

12. The method of claim 10, further comprising:
 identifying data elements that reside in a same cache line;
 identifying offsets of the data elements;
 generating control information to a data cache rotator based on the offsets; and
 sending one or more load operations until all non-masked data elements are gathered.

13. The method of claim 10, further comprising scheduling one write-back cycle to an execution unit of the processor in response to the first gather instruction.

14. The method of claim 10, further comprising:
 setting or clearing a snoop indication associated with the first gather instruction; and
 determining whether to retire the first gather instruction based on the snoop indication.

15. A system comprising:
 a data cache; and a processor comprising:
- a first gather logic unit to identify locality of data elements in response to a first gather instruction;
- a first memory comprising a plurality of memory rows including a first memory row associated with the first gather instruction, the first memory row including a first portion to store data obtained in response to the first gather instruction and a second portion to store a snoop indication; and
- a second memory to store one or more data element addresses accessed in response to the first gather instruction, the second memory to store a pointer to denote that the first gather instruction accessed the one or more data element addresses, wherein if a snoop hits a valid entry in the second memory corresponding to the one or more data element addresses, the snoop indication is stored in the first memory row; and
- a memory execution unit, coupled to the first memory, to manage gather instructions including the first gather instruction and to write back only once a result of the first gather instruction.

16. The system of claim 15, wherein the first gather logic unit is operable to:

- iteratively identify data elements that reside in a same cache line;
- identify offsets of the data elements;
- generate control information to a data cache rotator based on the offsets; and
- send one or more load operations until all non-masked data elements are gathered.

17. The system of claim 15, wherein the first gather logic unit is operable to schedule one write-back cycle to an execution unit of the processor in response to the first gather instruction.

18. The system of claim 15, wherein the first gather logic unit is operable to set or to clear the snoop indication associated with the first gather instruction and to determine whether to retire the first gather instruction based on the snoop indication.

* * * * *